United States Patent [19]

Rau

[11] 4,452,041
[45] Jun. 5, 1984

[54] HYDROSTATIC STEERING SYSTEM WITH DELAYED INPUT TORQUE COLUMN

[75] Inventor: Jim L. Rau, Lafayette, Ind.

[73] Assignee: TRW Inc., Cleveland, Ohio

[21] Appl. No.: 314,444

[22] Filed: Oct. 23, 1981

[51] Int. Cl.³ .............................................. F16D 31/02
[52] U.S. Cl. ........................................ 60/384; 60/452; 464/61; 464/97
[58] Field of Search ................. 60/384, 386, 445, 452; 91/375 A; 418/61 B; 464/61, 97

[56] References Cited

U.S. PATENT DOCUMENTS

| | | | |
|---|---|---|---|
| 2,855,789 | 10/1958 | Thungen | 74/388 |
| 3,301,011 | 1/1967 | Dye et al. | 464/97 |
| 3,347,041 | 10/1967 | Bahniuk et al. | 60/384 |
| 3,452,543 | 7/1969 | Goff et al. | 60/384 |
| 3,915,253 | 10/1975 | Ott et al. | 60/452 X |
| 3,931,711 | 1/1976 | Rau et al. | 60/445 |
| 3,985,888 | 7/1975 | Roberts | 60/384 X |
| 4,023,646 | 5/1977 | Heisig | 180/132 |
| 4,079,805 | 3/1978 | Rau | 60/445 X |
| 4,103,561 | 8/1973 | Baker | 60/384 X |
| 4,214,642 | 7/1980 | Dauvergne | 91/375 A |
| 4,252,207 | 2/1981 | Dauvergne | 91/375 A |

FOREIGN PATENT DOCUMENTS

| | | |
|---|---|---|
| 0038542 | 4/1981 | European Pat. Off. . |
| 0061005 | 2/1982 | European Pat. Off. . |
| 2073685 | 3/1981 | United Kingdom . |

Primary Examiner—Edward K. Look
Attorney, Agent, or Firm—Yount & Tarolli

[57] ABSTRACT

A torque absorbing coupling for a hydrostatic steering system which a hydrostatic steering controller responds to operation of a steering wheel to direct flow from a source to a steering motor. The coupling minimizes the possibility of a high reaction torque being felt by the operator who turns the steering wheel more rapidly than the system can deliver flow and pressure to the controller to levels which are sufficient to effect steering as demanded by the operator. The coupling is provided between the steering wheel and the controller's metering unit, and operates to absorb reaction torques over a time interval, and thereby delays transmission of those reaction torques to the operator over that time interval, to provide the system with an additional time interval to increase flow and pressure to the levels demanded.

19 Claims, 8 Drawing Figures

HYDROSTATIC STEERING SYSTEM WITH DELAYED INPUT TORQUE COLUMN

BACKGROUND OF THE INVENTION

This application relates to an improvement for a hydrostatic steering system which includes a fluid source, a steering motor, and a hydrostatic steering controller which is operated by a steering wheel and controls fluid flow from the source to the steering motor. It relates particularly to an improvement for a system such as a load sense system which increases flow and pressure delivered from the source to the controller during a steering maneuver. More specifically, it relates to a special coupling between the hydrostatic steering controller's metering unit and the steering wheel, which coupling minimizes the possibility of a high reaction torque being felt by a vehicle operator if flow and pressure delivered from the source to the controller are insufficient to effect a steering maneuver when the operator effects steering.

Examples of load sense hydrostatic steering systems are shown in U.S. Pat. Nos. 3,931,711 and 4,079,805 and pending U.S. application Ser. No. 243,497. Each of the systems includes a hydrostatic steering controller which is operated by the vehicle operator. The steering controller includes a metering unit which meters flow to the steering motor and a control valve which ports fluid from the fluid source to a metering unit, from the metering unit to the steering motor, and from the steering motor to a reservoir.

When there is no steering taking place, a minimum standby flow and pressure is communicated from the fluid source to the controller, and the control valve is in a neutral position. When the operator turns the steering wheel, the control valve moves away from the neutral position to an operating position and flow from the fluid source is increased, and directed to the metering unit. The flow is metered and then directed to the steering motor.

As the operator turns the steering wheel, the effort with which he turns the wheel is transmitted from an input member to the metering unit. Operation of the metering unit is resisted by the steering load which varies depending on various conditions including, e.g., whether the vehicle wheels are on ice, mud, etc. Thus, during steering, a reaction force is transmitted from the metering unit to the input member in accordance with the steering load resistance. The flow and pressure directed to the controller assist the metering unit in overcoming the steering load resistance, and directing metered amounts of fluid to the steering motor.

In the load sense system of U.S. Patent application Ser. No. 243,497, a pilot conduit directs a pilot flow of fluid through the controller to a reservoir when the control valve is in the neutral position. When steering occurs, the pilot flow is restricted, and a load sense signal is directed to a means which increases the flow and pressure delivered to the controller from the fluid source. The system of application Ser. No. 243,497 reacts quickly to turning of the steering wheel to provide the pressure signal for increasing flow and pressure delivered from the fluid source to the controller.

Nevertheless, despite the speed with which the system of application Ser. No. 243,497 reacts, there is still a time interval between the creation of the pressure signal and the point at which the increased flow and pressure are actually delivered to the controller. This time interval results from factors such as (1) the vehicle operator making so high a demand that the system simply cannot react fast enough to deliver the amount of flow and pressure demanded, and (2) the inertia of the mechanism which responds to the pressure signal to increase the flow directed from the source to the controller.

In the event that the operator makes a very high demand (i.e., a very rapid and forceful turning of the steering wheel), a sudden and unexpected reaction torque can be felt by the operator during the time interval it takes for the flow and pressure being directed to the controller to increase to the demanded levels. Specifically, if flow and pressure delivered to the controller were below demand levels as the valve reaches an operating position, the steering load resistance acting on the metering unit would cause a sudden increase in the reaction torque transmitted to the input member. That reaction torque, if transmitted directly to the steering wheel would be felt by the operator.

SUMMARY OF THE INVENTION

This application is directed to minimizing the possibility of a high reaction torque being felt by the vehicle operator who turns the steering wheel of a steering system more rapidly than the system can react to bring flow and pressure delivered to the controller to the demanded levels which are sufficient to effect steering as demanded by the operator.

Specifically, this application provides a coupling between the vehicle steering wheel and the hydrostatic steering controller's metering unit, which coupling operates to delay transmission of the reaction torque to the steering wheel in the event there is insufficient flow and pressure to effect steering of the vehicle as demanded by the operator. According to the invention, the coupling absorbs torques which would otherwise be immediately transmitted directly to the steering wheel. The coupling absorbs torques during a time interval to give the system an additional increment of time in which to bring flow and pressure being delivered to the controller to the levels demanded before a high reaction torque is felt by the vehicle operator. If the system increases flow and pressure to the demanded levels in that additional increment of time, the flow and pressure would assist the metering unit in overcoming the steering load resistance, thereby reducing the reaction torque transmitted to the steering wheel. Thus, the coupling minimizes the likelihood of a sudden and unexpected reaction torque being transmitted to the vehicle operator.

The hydrostatic steering controller includes a metering unit, a control valve, and an input member for actuating the control valve and the metering unit. The control valve is biased to a neutral position, and is connected to the metering unit and to the input member in such a way that upon actuation of the input member, the control valve moves away from the neutral position and to an operating position. When the control valve is in an operating position, flow is directed to the metering unit, the flow is metered and then directed to the steering motor. As the control valve moves away from the neutral position, flow and pressure delivered from the source are increased, and directed to the controller.

The metering unit and the control valve are coupled with the input member in such a manner that a steering load reaction torque is transmitted from the metering unit to the input member, and, in accordance with the invention, the aforementioned coupling is provided between the metering unit and the steering wheel, preferably between the input member and the steering wheel. The coupling transmits torque between the steering wheel and the metering unit and absorbs the reaction torque transmitted to the input member when the reaction torque exceeds a predetermined level.

With the invention, if the operator makes a steering maneuver, and the system increases flow and pressure to the controller fast enough so that the flow and pressure are at the demanded levels when the control valve reaches an operating position, the coupling provides a direct rotary drive between the steering wheel and the metering unit. However, in the event that an operator makes a very rapid steering demand, and the system does not respond fast enough to bring flow and pressure delivered to the controller to the demanded levels, the coupling operates to absorb the reaction torque developed by the metering unit, and therefore gives the system an additional increment of time to bring flow and pressure to the demanded levels.

BRIEF DESCRIPTION OF THE DRAWINGS

Further objects and advantages of the present invention will become apparent from the following detailed description of the present invention taken with reference to the accompanying drawings wherein.

DETAILED DESCRIPTION OF THE PREFERRED EMBODIMENT

As set forth above, the invention relates to an improvement for a system such as a load sense steering system with a hydrostatic steering controller which directs flow from a fluid source to a steering motor. The fluid source can be a variable displacement pump, a priority valve controlling flow from a fixed displacement pump, or a combination of both a variable displacement pump and a priority valve. The following detailed description relates to a system with a variable displacement pump. However, it will be clear to those of ordinary skill in the art that the invention is equally applicable in a system employing a priority valve such as shown in U.S. Patent application Ser. No. 243,497, filed Mar. 13, 1981.

Figure 1:
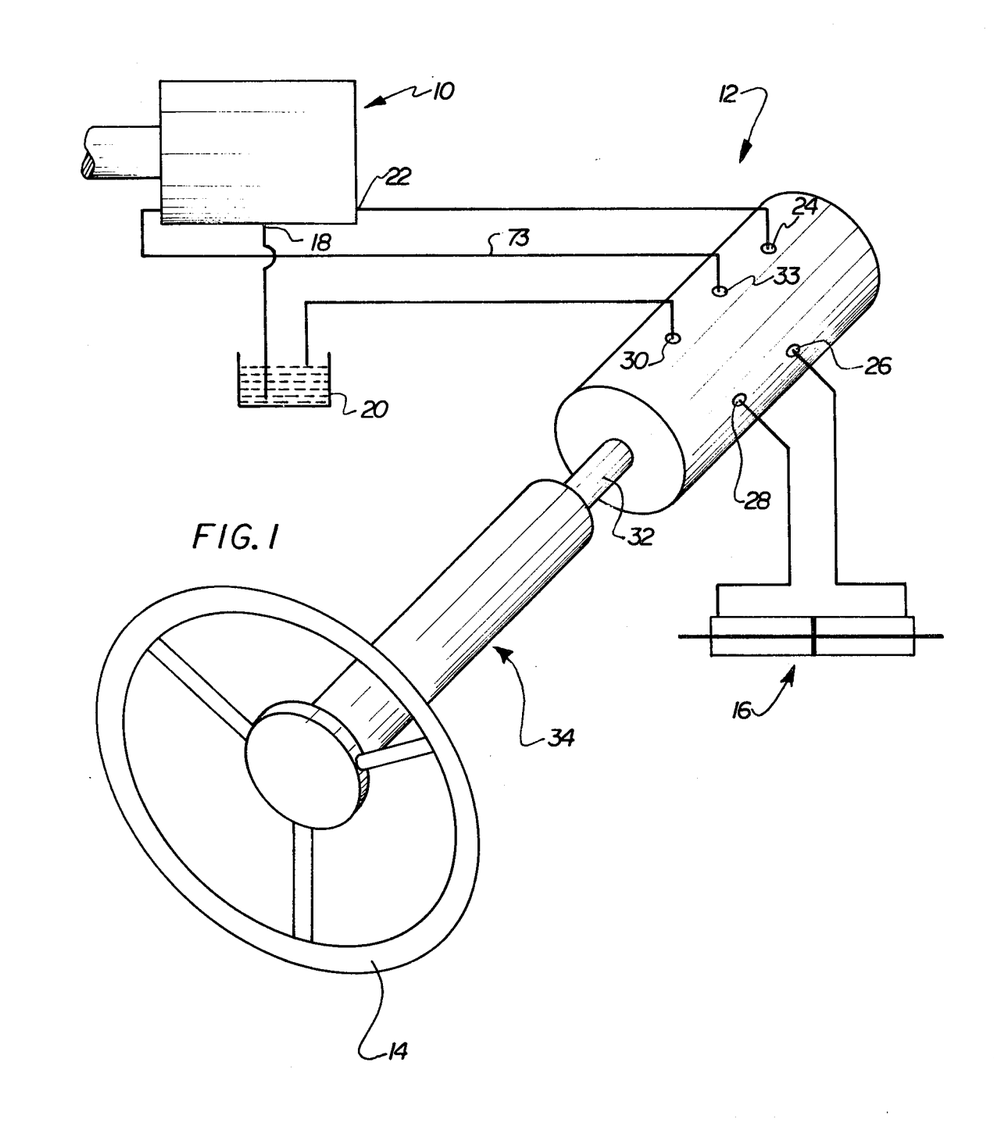
FIG. 1 is a schematic view of the elements of a steering system constructed according to the principles of the invention.

Referring to FIG. 1 a hydrostatic load sense steering system for a vehicle includes a variable displacement pump 10, a hydrostatic steering controller 12 which is operated by rotation of the vehicle's steering wheel 14, and a steering motor 16 which is connected to the vehicle's wheels.

The pump 10 includes an intake 18 connected to a fluid reservoir 20, and an outlet 22 connected to the inlet port 24 of the controller 12. The controller 12 further includes a pair of working ports 26, 28 connected to the opposite sides of the steering motor 16, a return port 30 connected to the reservoir 20, and a load sense port 33.

The load sense port 33 is connected to a mechanism for varying the displacement of the pump 10. The mechanism for varying the displacement of the pump can take different forms, but is preferably the type shown and described in connection with U.S. application Ser. No. 243,497. During a steering maneuver the steering controller provides a signal at the load sense port 33 which indicates a demand for flow and pressure, and that signal is used to vary the displacement of the pump 10 in order to bring flow and pressure to the demanded levels. When no steering is taking place the controller is biased to a neutral position, and the pressure at the load sense port 33 causes the pump 10 to be in a condition in which flow and pressure at the controller inlet 24 are at minimum standby levels.

The hydrostatic controller 12 is actuated away from its neutral position by rotation of an input member 32. As seen from FIG. 1, the vehicle's steering wheel 14 is coupled to the input member 32 through a steering column shown at 34. The steering column 34 is constructed according to the principles of the invention and operates to absorb high reaction torques which would otherwise be transmitted directly from the controller's metering unit to the input member 32 to the steering wheel 14 in the event that flow and pressure delivered from the pump 10 to the controller were below the demanded levels. The reaction torques are absorbed over a range of rotation of the steering wheel, and this gives the system an extra increment of time to bring the flow and pressure at the controller's inlet port 24 to the demanded levels.

Figure 2:
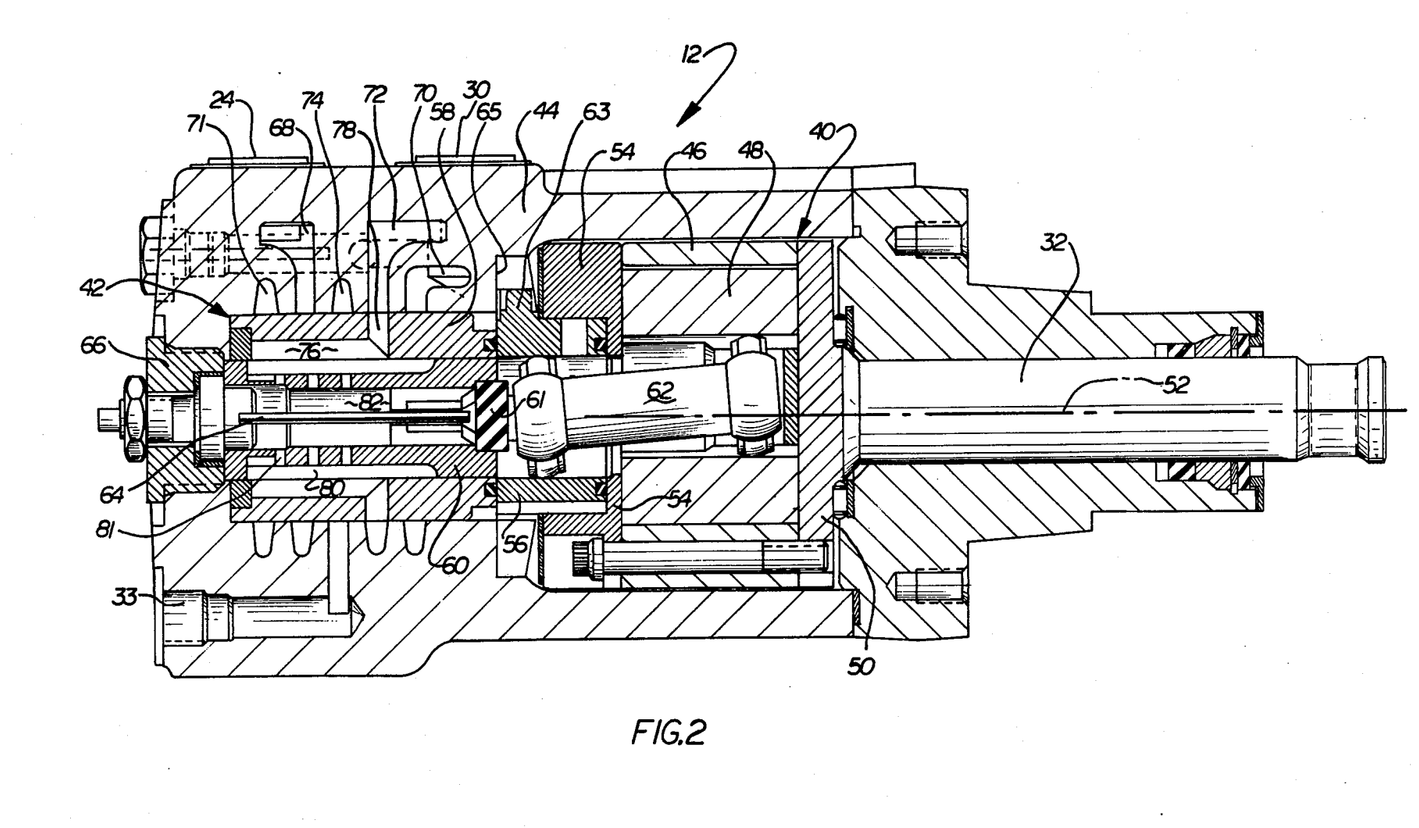
FIG. 2 is a fragmentary longitudinal sectional view of a hydrostatic controller according to the invention.

FIG. 2 illustrates the construction of the hydrostatic steering controller. The controller includes a positive displacement metering unit 40 and a control valve section 42 disposed within a housing 44. The input member 32 extends into the housing, and is supported for rotation about a central axis 52. The metering unit 40 and the control valve section 42 are connected with the input member 32, and are operated by rotation of the input member 32 about the central axis 52 as set forth more fully hereinafter.

The metering unit 40 is constructed according to the principles disclosed in U.S. Pat. No. 3,895,888. It includes a gerotor gear mechanism comprising an outer gear 46 having a series of internal teeth, and an inner gear 48 with external teeth numbering one less than the number of teeth of the outer gear 46. The outer gear 46 is bolted to a drive plate 50 which is fixed to the input member 32. Thus, the outer gear 46 rotates with the input member 32 about the central axis 52. The inner gear 48 is mounted eccentrically with respect to the outer gear 46, and is adapted to rotate about its central axis, and to orbit relative to the outer gear 46.

The inner and outer gears define expansible and contractible fluid pockets which expand and contract as the gears rotate and orbit relative to each other. A commutation valve arrangement controls flow to and from the expansible and contractible pockets in timed relation to the relative rotational and orbital movement of the gears. In accordance with the principles of U.S. Pat. No. 3,895,888, the commutation valve includes an outer member 54 which is bolted to and rotates with the outer gear 46, and an inner member 56 which can rotate with the inner gear 48.

The control valve section 42 is constructed according to the principles of U.S. Pat. No. 3,895,888 and U.S. application Ser. No. 243,497. It includes a part of the housing 44, a valve member 58 which is fixed in the housing, and a rotatable control valve member 60. The rotatable control valve member 60 is connected with the inner commutator valve member 56 (through an element 61), so that the control valve member 60 and the inner commutator valve member 56 can rotate jointly. An angular drive link 62 couples the inner gear 48 for joint rotation with the inner commutator valve member 56, thus also coupling the inner gear 48 for joint rotation with the rotatable control member 60.

A longitudinally extending torsion spring 64 biases the rotatable control valve member 60 to a neutral position. The torsion spring 64 has a first end connected to the rotatable control valve member 60 and a second end connected to a plug 66 which is fixed in the housing 44. Preferably, the torsion spring 64 comprises a pair of blades constructed according to the principles of U.S. Pat. No. 3,918,856.

When the rotatable control valve member 60 is in the neutral position, it blocks communication between the inlet port 24 and the metering unit 40. Thus, there is no flow from the inlet port 24 through the metering unit 40 to the steering motor.

The rotatable control valve member 60 is shifted from the neutral position to an operating position by rotation of the input member 32, in accordance with the principles of U.S. Pat. No. 3,895,888. In response to initial rotation of the input member 32, the outer gerotor gear 46 also rotates. The inner gerotor gear 48 rotates jointly with the outer gerotor gear 46. The rotation of the inner gerotor gear 48 rotates the control valve member 60 to shift the control valve member 60 away from its neutral position and to an operating position where it communicates the inlet port 24 with one side of the metering unit 40, and communicates the other side of the metering unit 40 with the steering motor 16. The relative range of rotation of the control valve member 60 away from the neutral position is limited by a lug 63, which is carried by inner commutator valve member 56, and which can move to a limited extent in a slot 65 formed in the housing 44.

Further, in accordance with the principles of U.S. Pat. No. 3,895,888 and U.S. application Ser. No. 243,497, the flow from the inlet port 24 to the metering unit 40, and from the metering unit 40 to the steering motor 16 is controlled by the control valve section 42. Referring to FIG. 2, the housing 44 includes an annular groove 68 connected with the inlet port 24, another annular groove 70 connected with the return port 30, a pair of annular grooves 71, 72 connected to the working ports 26, 28 and an annular groove 74 connected with the load sense port 33. The fixed valve member 58 includes a plurality of longitudinal grooves 76 extending to its inner surface, and respective radial passages 78 for communicating those grooves with respective annular grooves (68, 70, 71, 72, 74) in the housing. The rotatable control valve member 60 also includes a plurality of longitudinal grooves 80 which extend to its outer periphery, and a longitudinally extending central passage 82 connected to certain of the grooves 80 via radial passages 81.

In response to rotation of the input shaft 32 in one direction, the control valve member 60 is rotated away from the neutral position and to an operating position. When the control valve member 60 is in an operating position, the opposite sides of the metering unit 40 are communicated with the inlet port 24 and one of the working ports 26, 28 through the commutator valve and either (i) the central passage 82 in the control valve member 60, or (ii) certain of the longitudinal grooves 80 in the control valve member 60. The other working port is vented to the return port 30. The rotation of the outer gerotor gear 46 rotates the outer commutator valve member 54 relative to the passages in the inner commutator valve member 56. This valves the flow being directed to and from the expanding and contracting pockets of the gerotor metering unit 40.

In accordance with the further principles set forth in U.S. Pat. No. 4,079,805, the controller is designed to direct a pilot flow of fluid to the return port 30 when the control valve member 60 is in the neutral position. During steering, the control valve member 60 moves away from neutral and restricts the pilot flow and thereby provides a pressure signal for demanding increased flow and pressure from the source. The variable displacement pump 10 includes a means (not shown) which directs a pilot flow of fluid to a conduit 73 leading to the load sense port 33. That pilot flow of fluid is communicated with the annular groove 74 in the housing, and is directed by the control valve section 42 to the return port and reservoir 20 when the controller is in neutral. When the control valve member 60 is moved away from neutral and toward an operating position, the pilot flow of fluid is restricted, thus causing a pressure increase in the conduit 73. In accordance with the principles of U.S. Pat. No. 4,079,805, an increase in the pressure in conduit 73 operates a mechanism which increases the displacement of the pump, thereby increasing the amount of fluid directed to the inlet port 24 of the controller.

In addition, in accordance with the principles of U.S. Pat. Nos. 3,931,711 and 4,079,805 and of pending U.S. application Ser. No. 243,497, a variable orifice is provided in the flow path between the inlet port 24 and the metering unit 40 when the controller is in an operating position. When the controller is in an operating position, the variable orifice is communicated with the pilot port 33. The variable orifice varies in size (flow area) in accordance with steering demand. Thus, when the controller is in an operating position, the variable orifice causes pressure in the conduit 73 to vary in accordance with steering demand.

As set forth above, despite the rapidity with which the foregoing systems can increase the flow and pressure at the inlet port 24, the systems may not react fast enough to bring flow and pressure delivered from the pump to the controller to the demand levels as the control valve reaches an operating position. For example, the inertia of the mechanism which increases pump displacement can delay the speed with which the pressure and flow delivered to the controller are increased to the demand levels. As set forth above, when the control valve reaches an operating position, the metering unit 40 acts as a torque convertor with respect to the steering load pressure, and the connection between the metering unit 40 and the input member 32 transmits a reaction torque to the input member 32. In the event that an operator makes a very high demand, a high steering load pressure would be converted by the metering unit to a high reacton torque which would be transmitted to the input member 32 during the time interval between actuation of the control valve 60 and the point where flow and pressure delivered to the controller increased to the demanded levels.

Figure 3:
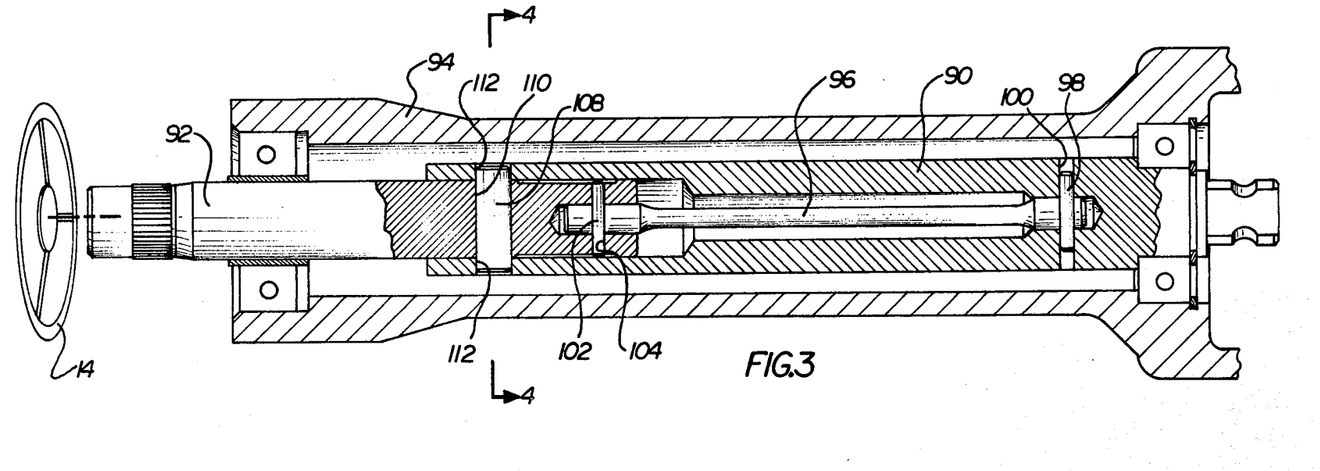
FIG. 3 is a longitudinal sectional view of a coupling which, according to the invention, connects the vehicle steering wheel with the hydrostatic controller.

According to the invention, the steering column 34 contains a special coupling between the steering wheel 14 and the input member 32 of the controller, and that coupling operates to absorb high reaction torques which would otherwise be transmitted from the input member 32 to the steering wheel 14 while flow and pressure being delivered to the controller rise to the demand levels. Referring to FIG. 3, the steering input column includes an input shaft 92 which is coupled to the vehicle steering wheel 14, and an output shaft 90 which is coupled to the input member 32 of the controller. As shown by FIG. 3, both the input and the output shafts are rotatably supported by bearings in the steering column housing 94.

A torsion bar 96 connects the input shaft 92 with the output member 90. As seen in FIG. 3, the torsion bar 96 has a transverse pin 98 at one end which extends into an opening 100 in the output shaft 90 and secures that end of the torsion bar to the output shaft 90 for joint rotation. The torsion bar 96 has another transverse pin 102 at its other end which extends into an opening 104 in the input shaft 92 and secures the other end of the torsion bar to the input shaft for joint rotation.

Figure 4:
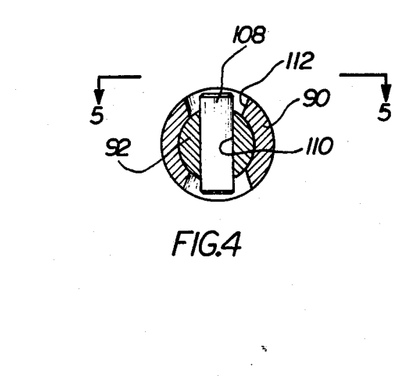
FIG. 4 is a sectional view of a part of the coupling of FIG. 3, taken along the line 4—4.
Figure 5:
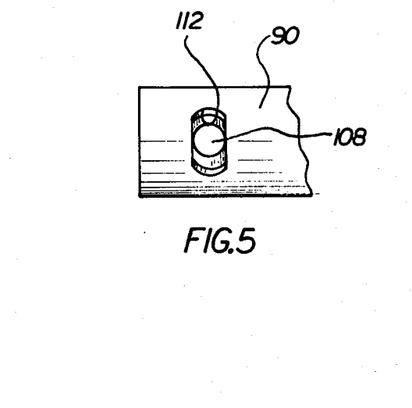
FIG. 5 is an elevational view of part of the coupling of FIG. 3, taken from the direction 5—5 in FIG. 3.

A lost motion coupling between the input and output shafts allows a limited range of relative rotation of the input and output shafts. Specifically, referring to FIGS. 3, 4 and 5, a pin 108 extends through a radial passage 110 in the input shaft 92 and also extends into pair of slots 112 in the output shaft 90. As seen from FIGS. 4 and 5, the slots 112 are dimensioned so that the pin 108 has a limited range of rotation therein.

When the steering wheel 14 is rotated, the input shaft 92 is rotated along with the steering wheel. The torsion rod 96 can transmit some torque between the input and output shafts 92, 90 so that if there were minimal resistance felt at the output shaft 90, the input and output shafts could rotate essentially jointly. However, if the resistance felt at the output shaft 90 exceeds a predetermined amount, the torsion bar 96 can twist additionally to absorb torque and minimize the transmission of torque to the input shaft 92. With higher reaction torques, the input shaft 92 can rotate relative to the output shaft 90 to an extent determined by the length of the slots 112 while the torsion rod 96 absorbs forces. Should the input shaft 92 rotate beyond that predetermined range of relative rotation, then the reaction felt at the output shaft 90 would be transmitted directly to the input shaft 92.

The significance of the invention primarily resides in the way it operates to delay the transmission of high reaction torques from the input member 32 to the steering wheel 14 over an increment of time, to allow the system that extra increment of time to bring flow and pressure being delivered to the controller to the demanded levels. When steering is initiated, there is no flow from the inlet port to the metering unit, and the gears 46, 48 are in a "torque conversion lock-up" condition (i.e., they may rotate together, but they do not have relative orbital movement). There is a direct gear drive through the metering unit 40 to the control valve member 60, and that gear drive is mainly resisted by the torsion spring 64 which grounds the control valve 60 to the housing. The torsion spring 64 is fairly light, and offers relatively little resistance to movement. Thus, when the steering wheel is operated, and the control valve member 60 begins to move away from neutral and toward its operating position, there is initially a small reaction torque felt at the input member 32. Indeed, the reaction torque is light enough that the control valve member 60 is rotated essentially by a direct drive through the torsion rod 96 and the input and output shafts 92, 90.

When the control valve 60 reaches an operating condition, the inlet port is communicated with one side of the metering unit, and the other side of the metering unit is communicated with one of the cylinders of the steering motor 16. Thus, the meterng unit is exposed to the pressure of the steering load. During steering, for the metering unit to "operate" (i.e. for gears 46 and 48 to rotate and orbit relative to each other), it must create a reaction pressure which overcomes the steering load. Until that reaction pressure is created, the gears 46, 48 are essentially in the aforementioned "lock-up" condition. When the gears 46, 48 are in the "lock-up" condition, they do not orbit relative to each other, but can rotate to effect joint rotation of the valves 56, 60, until the lug 63 on valve 56 reaches the end of its range of travel in slot 65. With continued steering effort, the gears 46, 48 would not move further until either (i) the system flow and pressure, (ii) the input torque from the operator, or (iii) a combination of the system flow and pressure and the operator's input torque, enabled them to generate sufficient pressure to overcome the steering load. When the gears are in a "lock-up" condition, a high reaction torque can be transmitted to the input member 32.

During a steering effort, the system is designed to bring flow and pressure to the levels required (demanded) to allow the metering unit to operate, and to make the steering maneuver in accordance with the operator's demand. If the system responds fast enough to bring flow and pressure to the demand levels, any reaction force transmitted directly from the metering unit to the steering wheel would be within the reaction torque of the centering spring 64. However, in the event that the flow and pressure do not reach the demanded levels fast enough, a high reaction torque is generated through the metering unit, and transmitted to the input member 32 and the output shaft 90. If the reaction torque were transmitted directly back to the input shaft 92, it could be felt at the steering wheel 14 as an unexpected resistance to steering.

With the coupling of the invention, if the reaction torque is high enough, the torsion bar 96 will twist to absorb torques while allowing a limited amount of rotation of the input shaft 92 relative to the output shaft 90. This relative rotation of the input and output shafts 92, 90 delays the transmission of high reaction torques to the input shaft 92, and thereby provides an additional increment of time for the system to bring flow and pressure being directed to the controller to the demand levels, so that they can assist the metering unit in satisfying the steering demand.

Figures 6, 7, 8:
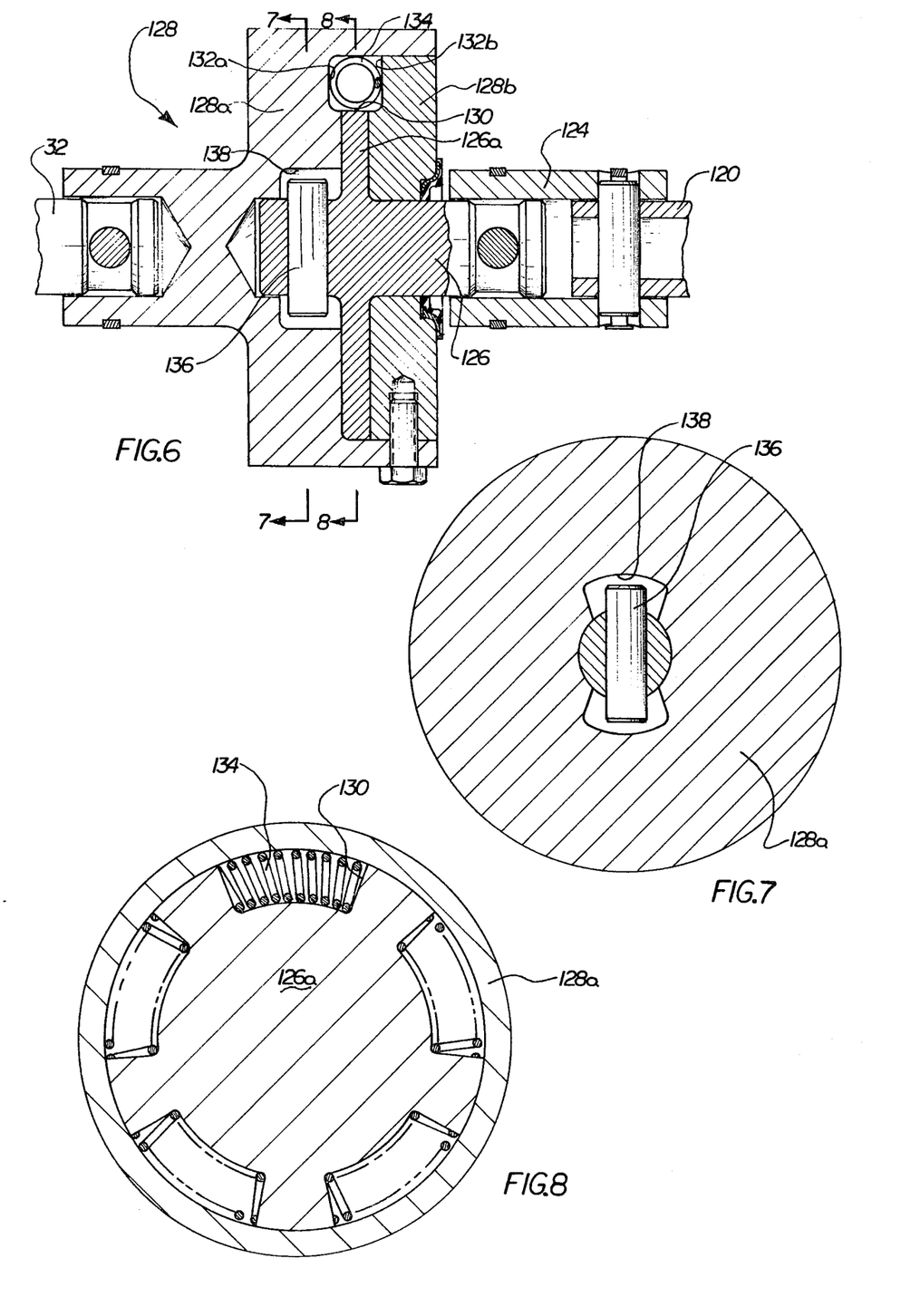
FIG. 6 is a longitudinal sectional view of a coupling according to a modified form of the invention.
FIG. 7 is a sectional view of the coupling of FIG. 6, taken along the line 7—7.
FIG. 8 is another sectional view of the coupling of FIG. 6, taken along the line 8—8.

FIGS. 6-8 show an alternative embodiment of a coupling according to the invention. The alternative coupling includes an input shaft 120 which is connected to the steering wheel and an output member 128 which is coupled to the input shaft 32 of the hydrostatic controller. The input shaft 120 is coupled for joint rotation with a sleeve 124, and the sleeve 124 is, in turn, coupled for joint rotation with a member 126. The output member 128 which comprises a pair of members 128a, 128b bolted together, is coupled for joint rotation with the controller input shaft 32. A pin 136 carried by the member 126 has a limited range of rotation in a slot 138 in the output member 128.

The member 126 has a radial flange 126a disposed between the members 128a, 128b. The flange 126a has a series of circumferentially extending slots 130 at its outer of periphery. The members 128a, 128b have slots 132a, 132b which are aligned with the slots 130. A series of helical springs 134 are disposed in the slots 130. As seen from FIG. 6, springs 134 are wider than the radial member 126, so that they extend into the aligned slots 132a, 132b in the members 128a, 128b. Further, the dimensions (e.g., the free length, the coil diameter, the diameter of the wire, the number of active coils, the torsional modulus, etc.) of springs 134 are preferably chosen so that when no steering is taking place, each spring 134 is compressed between an end surface of its slot 130 and an end surface of at least one of the aligned slots 132a, 132b. Thus, the coupling is in a preloaded condition.

With the construction of FIGS. 6–8, in the event that little or no resistance is felt at the output member 128, the coupling essentially provides a direct drive from the steering wheel to the control valve. That drive is through the radial flange member 126a of member 126 and the helical springs 134 to the output member 128. In the event a high resistance is felt at the output member 128, the springs 134 can be compressed to absorb torque forces and thereby minimize the torque forces from being transmitted to the steering wheel, at least over the relative range of rotation allowed by the pin 136 and slot 138.

With the embodiment of FIGS. 6–8, if the helical springs 134 are initially in a preloaded condition, they set a torque preload which must be reached before there is lost motion between the members 120 and 32. Further, by selectively varying certain dimensions of the springs 134 (e.g., the free length of the springs) the torque preload of the coupling can be selectively controlled. By controlling the torque preload, the amount of torque which will be absorbed by the coupling before there is lost motion between the members 120 and 32 can be controlled.

Further, it should be understood that the embodiment illustrated by FIGS. 6–8 could be configured within the controller as an alternate construction of the input member 32. Specifically, the input member 32 could carry a radial flange similar to 126a, and that flange could be coupled to the outer gerotor gear 46 through a lost motion coupling and spring engagement similar to that shown in FIGS. 6–8.

With either of the foregoing embodiments, the coupling beween the input member and the steering wheel absorbs the reaction torque transmitted to the input member when the reaction torque exceeds a predetermined amount. That predetermined amount is determined by factors such as (i) the relative spring rates of the biasing spring 64 and the torsion rod 96 in the embodiment of FIGS. 2–5, and (ii) the spring rate of the biasing spring, the spring rate of the helical springs 134, and any preload on the springs 134, in the embodiment of FIGS. 6–8.

Thus, the present invention provides a system and an apparatus which delays transmission of high reaction torques to the steering wheel, in the event that during a steering maneuver the system does not react fast enough to bring flow and pressure to the levels which are sufficient to effect steering as demanded by an operator. The invention is particularly useful in load sense steering systems in which the controller signals the source to increase flow and pressure during a steering maneuver. The invention would also be useful with other types of steering systems (e.g. steering system which receive flow from a priority flow divider valve) in which flow and pressure may be at insufficient levels to effect steering as demanded by an operator.

What is claimed is:

1. A load sense hydrostatic steering system for a vehicle comprising
    (a) a fluid source,
    (b) a steering motor,
    (c) a hydrostatic steering controller which is operated by a steering wheel to control flow from the fluid source to the steering motor, said controller including an input member, a metering unit and a control valve, means biasing said control valve to a neutral position in which there is no flow from the source to the steering motor, means connecting said control valve and said metering unit with said input member for moving said control valve away from said neutral position and to an operating position in response to rotation of said input member, said control valve when in said operating position directing flow from said source to said metering unit and directing metered flow from said metering unit to said steering motor,
    said controller having means for providing a load sense signal, means for directing said load sense signal toward said source for increasing flow from the source as said control valve moves away from said neutral position,
    said means connecting said input member with said control valve and said metering unit transmitting a steering load reaction torque to said input member, and
    (d) means coupling said input member to the steering wheel for effecting rotation of said input member in response to a steering effort and for absorbing the reaction torque transmitted to said input member when the reaction torque exceeds a predetermined amount, said means coupling said input member to the steering wheel comprising a lost motion connection between said steering wheel and said input member for allowing a limited amount of rotation of said steering wheel with respect to said input member, and spring means which is deflectable by relative rotation of said steering wheel and input member to absorb the reaction torque when the reaction torque exceeds said predetermined amount.

2. A load sense hydrostatic steering system as defined in claim 1 wherein said metering unit and said control valve are disposed in a housing, said input member being rotatably supported in said housing, said means biasing said control valve to a neutral position comprising a biasing spring acting between said control valve and said housing, said metering unit comprising inner and outer gerotor gear members which can rotate and orbit relative to each other, said means connecting said control valve and said metering unit with said input member comprising means for connecting said input member with said outer gerotor gear for joint rotation and means for connecting said control valve with said inner gerotor gear for joint rotation and for allowing said inner gerotor gear to orbit relative to said outer gerotor gear.

3. A load sense hydrostatic steering system as defined in claim 2 wherein said spring means comprises a longitudinal torsion spring having a first portion coupled for joint rotation with said steering wheel, and a longitudinally spaced second portion coupled for joint rotation with said input member, said torsion spring being twistable about its longitudinal axis to absorb the reaction torque transmitted to said input member.

4. A load sense hydrostatic steering system as defined in claim 2 wherein said input member is rotatable about a central axis, said means coupling said input member to the steering wheel comprising a first member connected to the steering wheel and having a first radially extending portion and a second member connected to said input member and having a second radially extending portion adjacent said first radially extending portion, said first radially extending portion including at least one circumferentially extending slot, and the second radially extending portion of said second member having a circumferentially extending slot facing said circumferentially extending slot in said first radially extending portion, said spring means comprising a helical spring disposed in the circumferentially extending slot in said first radially extending portion and having a diameter great enough so that said spring extends partially into the facing circumferentially extending slot in said second radially extending portion of said second member, said slot in said first radially extending portion being circumferentially shiftable relative to the slot in said second radially extending portion of said second member to compress said helical spring and cause said helical spring to absorb the reaction torque transmitted to said input member.

5. A load sense hydrostatic steering system as defined in claim 4 wherein the helical spring is compressed between respective end surfaces of facing slots in said first radially extending portion and said second radially extending portion when said control valve is in said neutral position, so that said means coupling said input member to the steering wheel is in a preloaded condition.

6. A load sense hydrostatic steering system comprising:
a fluid source,
a steering motor,
a hydrostatic steering controller which is operated by a steering wheel to control flow from the source to the motor,
means operable during a time interval for increasing flow from said source, and for delivering the increased flow to said controller,
said controller including an input member, a control valve and a metering unit, said control valve being coupled with said metering unit and being movable away from a neutral position by operation of said input member,
said control valve, after a predetermined amount of movement away from said neutral position, reaching an operating position in which it directs flow to the metering unit and directs metered flow from the metering unit to the steering motor,
means for transmitting a steering load reaction force from said metering unit to the input member,
said control valve as it moves away from its neutral position providing a load sense signal and directing the load sense signal toward said means operable during a time interval for increasing flow from said source, and
coupling means for transmitting rotary torque between said steering wheel and said input member and for absorbing the steering load reaction force transmitted to said input member during said time interval, thereby reducing the torque transmitted to the steering wheel during said time interval, said coupling means comprising a lost motion connection between said steering wheel and said input member for allowing a limited amount of rotation of said steering wheel with respect to said input member, and spring means which is deflectable by relative movement of said steering wheel and said input member to absorb the reaction torque transmitted from said metering unit to said input member when said reaction torque exceeds a predetermined amount.

7. A load sense hydrostatic steering system as defined in claim 6 wherein said metering unit and said control valve are disposed in a housing, said input member being rotatably supported in said housing, means biasing said control valve to a neutral position comprising a biasing spring acting between said control valve and said housing, said metering unit comprising inner and outer gerotor gear members which can rotate and orbit relative to each other, said means connecting said control valve and said metering unit with said input member comprising means for connecting said input member with said outer gerotor gear for joint rotation and means for connecting said control valve with said inner gerotor gear for joint rotation and for allowing said inner gerotor gear to orbit relative to said outer gerotor gear.

8. A load sense hydrostatic steering system as defined in claim 7 including a longitudinal torsion spring having a first portion coupled for joint rotation with said steering wheel, and a longitudinally spaced second portion coupled for joint rotation with said input member, said torsion spring being twistable about its longitudinal axis to absorb torque for absorbing the reaction torque transmitted to said input member.

9. A load sense hydrostatic system as defined in claim 7 wherein said input member is rotatable about a central axis, and said coupling means comprising a first member connected to the steering wheel and having a first member having a first radially extending portion and a second member connected to said input member and having a second radially extending portion adjacent said first radially extending portion, said first radially extending portion including at least one circumferentially extending slot, and the second radially extending portion of said second member having at least one circumferentially extending slot facing said circumferentially extending slot in said first radially extending portion, a helical spring disposed in the circumferentially extending slot in said first radially extending portion and having a diameter great enough so that said spring extends partially into the facing slot in said second radially extending portion of said second member, said slot in said first radially extending portion being circumferentially shiftable relative to the slot in said second radially extending portion of said second member to compress said helical spring and cause said helical spring to absorb the reaction torque transmitted to said input member.

10. A load sense hydrostatic system as defined in claim 9 wherein the helical spring is compressed between respective end surfaces of facing slots in said first radially extending portion and said second radially extending portion when said control valve is in said neutral position, so that said coupling means is in a preloaded condition.

11. A torque absorbing coupling for use in a load sense hydrostatic steering system for a vehicle, which system comprises
- a fluid source,
- a steering motor,
- a hydrostatic steering controller which is operated by a steering wheel to control flow from the source to the steering motor, the hydrostatic steering controller including an input member, a metering unit and a control valve, means biasing the control valve to a neutral position in which there is no flow from the source to the steering motor, means connecting the control valve and said metering unit with the input member for moving said control valve away from the neutral position and to an operating position in response to rotation of the input member, the control valve when in the operating position directing flow from said source to said metering unit and directing metered flow from the metering unit to the steering motor,
- the controller having means for providing a load sense signal, means for directing the load sense signal toward the source for increasing flow from the source as the control valve moves away from the neutral position, and
- the means connecting the input member with the control valve and the metering unit transmitting a steering load reaction force to the input member,
- said torque absorbing coupling comprising means for coupling the input member to the steering wheel for effecting rotation of the input member in response to a steering effort and for absorbing the reaction torque transmitted to the input member when the reaction torque exceeds a predetermined amount, said means for coupling the input member to the steering wheel comprising a lost motion connection between the steering wheel and the input member for allowing a relative amount of rotation of the steering wheel with respect to the input member, and spring means which is deflectable by relative rotation of the steering wheel and the input member to absorb the reaction torque when the reaction torque exceeds said predetermined amount.

12. A torque absorbing coupling as defined in claim 11 for a load sense hydrostatic steering system wherein said spring means comprises a longitudinal torsion spring having a first portion coupled for joint rotation with the steering wheel, and a longitudinally spaced second portion coupled for joint rotation with the input member, said torsion spring being twistable about its longitudinal axis to absorb the reaction torque transmitted to the input member.

13. A torque absorbing coupling as defined in claim 11 for a load sense hydrostatic steering system wherein the input member is rotatable about a central axis, said means for coupling the input member to the steering wheel comprising a first member for connection with the steering wheel and having a first radially extending portion and a second member for connection with the input member and having a second radially extending portion adjacent said first radially extending portion, said first radially extending portion including at least one circumferentially extending slot, and the second radially extending portion of said second member having at least one circumferentially extending slot facing said circumferentially extending slot in said first radially extending portion, said spring means comprising a helical spring disposed in said circumferentially extending slot in said first radially extending portion and having a diameter great enough so that said spring extends partially into the facing slot in said second radially extending portion of said second member, said slot in said first radially extending portion being circumferentially shiftable relative to the slot in said second radially extending portion of said second member to compress said helical spring and cause said helical spring to absorb the reaction torque transmitted to said input member.

14. A hydrostatic steering controller which is operated by a steering wheel to control flow from a fluid source to a steering motor including
- an input member,
- a metering unit,
- a control valve,
- first spring means for biasing said control valve to a neutral position in which there is no flow from the source to the steering motor,
- means for connecting said control valve and said metering unit with said steering wheel for moving said control valve away from said neutral position and to an operating position in response to rotation of the steering wheel, said control valve when in said operating position directing flow from the source to said metering unit and directing metered flow from the metering unit to said steering motor,
- said metering unit including a pair of gerotor gears which can rotate and orbit relative to one another to meter flow when said control valve is in said operating position, and said pair of gerotor gears receiving a steering load reaction torque when said control valve is in said operating position,
- said means for connecting said control valve and said metering unit with the steering wheel including means for coupling said steering wheel with one of said pair of gerotor gears,
- said means coupling said steering wheel with said one gerotor gear comprising a lost motion connection between the steering wheel and said one gerotor gear for allowing a relative amount of movement of the steering wheel with respect to said one gerotor gear, and including second spring means which is deflectable by relative rotation of the steering wheel and said one of said gerotor gears to absorb the reaction torque when the steering load reaction torque exceeds a predetermined amount.

15. A hydrostatic steering controller as defined in claim 14 wherein said metering unit and said control valve are disposed in a housing, said first spring means acting between said control valve and said housing, and said second spring means disposed in a torque transmission path extending between said steering wheel and said one gerotor gear.

16. A hydrostatic steering controller as defined in claim 15 wherein an input member is rotatably supported in said housing, said metering unit comprising an outer gerotor gear coupled for joint rotation with said input member and an inner gerotor gear which is connected for joint rotation with said control valve and which can orbit relative to said outer gerotor gear, said inner and outer gerotor gears transmitting the steering load reaction torque to said input member, said means coupling said steering wheel with the one gerotor gear comprising a lost motion coupling between said steering wheel and said input member, and said second spring means acting between said steering wheel and said input member and being deflectable by relative motion therebetween.

17. A hydrostatic steering controller as defined in any of claims 14, 15 or 16 wherein said second spring means comprises a longitudinal torsion spring having a first portion coupled for joint rotation with said steering wheel, and a longitudinally spaced second portion coupled for joint rotation with said input member, said torsion spring being twistable about its longitudinal axis to absorb the reaction torque transmitted to said input member.

18. A hydrostatic steering controller as defined in any of claims 14, 15 or 16 wherein said input member is rotatable about a central axis, said means coupling said steering wheel with said one gerotor gear comprising a first member connected to the steering wheel and having a first radially extending portion and a second member connected to said input member and having a second radially extending portion adjacent said first radially extending portion, said first radially extending portion including at least one circumferentially extending slot, and the second radially extending portion of said second member having at least one circumferentially extending slot facing said circumferentially extending slot in said first radially extending portion, said second spring means comprising a helical spring disposed in the circumferentially extending slot in said first radially extending portion and having a diameter great enough so that said spring extends partially into the facing slot in said second radially extending portion of said second member, said slot in said first radially extending portion being circumferentially shiftable relative to the slot in said second radially extending portion of said second member to compress said helical spring and cause said helical spring to absorb the reaction force transmitted to said input member.

19. A hydrostatic steering controller as defined in claim 18 wherein said helical spring is compressed between respective end surfaces of facing slots in said first radially extending portion and said second radially extending portion when said control valve is in said neutral position, so that said means coupling said input member to the steering wheel is in a preloaded condition.

* * * * *